(12) United States Patent
de Villiers

(10) Patent No.: US 11,620,759 B2
(45) Date of Patent: Apr. 4, 2023

(54) SYSTEMS AND METHODS FOR MACHINE LEARNING ENHANCED IMAGE REGISTRATION

(71) Applicant: Apple Inc., Cupertino, CA (US)

(72) Inventor: Jason de Villiers, Cambridge (GB)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 16/937,846

(22) Filed: Jul. 24, 2020

(65) Prior Publication Data

US 2022/0028091 A1    Jan. 27, 2022

(51) Int. Cl.
| | |
|---|---|
| *G06T 7/33* | (2017.01) |
| *G06N 20/00* | (2019.01) |
| *G06T 5/50* | (2006.01) |
| *G06V 10/46* | (2022.01) |

(52) U.S. Cl.
CPC ............. *G06T 7/33* (2017.01); *G06N 20/00* (2019.01); *G06T 5/50* (2013.01); *G06V 10/462* (2022.01); *G06T 2207/10036* (2013.01); *G06T 2207/10048* (2013.01); *G06T 2207/20221* (2013.01)

(58) Field of Classification Search
CPC ... G06T 7/33; G06T 5/50; G06T 2207/10036; G06T 2207/10048; G06T 2207/20221; G06N 20/00; G06V 10/462
See application file for complete search history.

(56) References Cited

U.S. PATENT DOCUMENTS

| | | | | |
|---|---|---|---|---|
| 6,950,493 B2* | 9/2005 | Besson | ............. | A61B 6/488 |
| | | | | 378/16 |
| 9,171,355 B2* | 10/2015 | Zhuo | ............. | G06T 5/50 |
| 9,569,695 B2* | 2/2017 | Pau | ............. | H04N 19/57 |
| 10,496,883 B2* | 12/2019 | Kwan | ............. | G06V 20/13 |
| 10,825,158 B2* | 11/2020 | Tanaka | ............. | G06T 7/33 |
| 10,853,642 B2* | 12/2020 | Gottemukkula | ....... | G06N 3/084 |
| 11,006,040 B2* | 5/2021 | Ono | ............. | H04N 5/2258 |
| 11,070,749 B2* | 7/2021 | Weng | ............. | G06T 5/50 |
| 2018/0209853 A1* | 7/2018 | Kraus | ............. | G01J 5/0014 |
| 2020/0104719 A1* | 4/2020 | Wiltshire | ............. | G06V 10/70 |
| 2022/0028091 A1* | 1/2022 | de Villiers | ............. | G06T 7/33 |

* cited by examiner

*Primary Examiner* — Gregory M Desire
(74) *Attorney, Agent, or Firm* — Blank Rome LLP

(57) ABSTRACT

Devices, methods, and program storage devices for training and leveraging machine learning (ML) models to use in image registration, especially on unaligned multispectral images, are disclosed, comprising: obtaining aligned multispectral image data; generating a first plurality of feature descriptors for features identified in the aligned multispectral image data; generating a training set of feature descriptor pairs based on the first plurality of feature descriptors; and training a ML model based on the training set of feature descriptor pairs, wherein the trained ML model is configured to determine matches between features in unaligned multispectral image data. The techniques may then: obtain unaligned multispectral image data; generate a second plurality of feature descriptors for features identified in the unaligned multispectral image data; and use the trained ML model to determine matches between features in the second plurality of feature descriptors, which matches may be used in performing image registration and/or fusion operations.

20 Claims, 7 Drawing Sheets

SYSTEMS AND METHODS FOR MACHINE LEARNING ENHANCED IMAGE REGISTRATION

TECHNICAL FIELD

This disclosure relates generally to the field of digital image processing. More particularly, but not by way of limitation, it relates to techniques for training and developing machine learning (ML) models to aid in the performance of image registration of digital images, especially digital images comprising multispectral image data.

BACKGROUND

Image registration is the process of warping (or otherwise manipulating) an input image so that it can be overlaid on another image (sometimes referred to as a "reference image"), such that the respective contents of the two images align with each other as well as possible after the image registration operation has been performed. There are various reasons why image registration operations may be performed on captured images. For example, multiple image capture devices that are unaligned (e.g., image sensors that are mounted next to each other, such as in a vertical or horizontal orientation, on one side of a single electronic device) may be used to capture concurrent images of the same scene, which images may need to be registered with one another before further image processing operations may be performed on said images. Alternatively, it may be desirable to stitch together multiple images of different parts of the same scene that are captured by a single image capture device held at different poses and/or moved over a given time interval (e.g., in the case of a user capturing a panoramic image). In machine vision applications, stereo cameras may also be used to provide depth of field (and other advantages) which, in turn, may require that the images from the stereo cameras are properly registered before further analysis may be performed.

An "image feature," as used herein, preferably contains two components: 1) an image coordinate; and 2) a feature descriptor, which may be algorithmically-derived from the image content in an area surrounding the feature's image coordinate. A typical method to register images may involve identifying matching features in both the input image and the reference image and then calculating a mapping function (e.g., a warping function, or other set of equations and/or parameters describing a desired transformation), such that the coordinates of the set of features in the input image are transformed, via the calculated mapping function, to be as close as possible to the coordinates of the respective matching features in the reference image. If enough matching features are found between the images being registered (and such features are sufficiently spatially-distributed in the images), then the mapping function can be applied to each pixel in the input image (i.e., not merely the pixels at the coordinates of the identified matching features) to warp the input image so that it can be overlaid on the reference image. Different methods for generating mapping functions exist, e.g., depending on what changes are expected between the two images. Typical changes that can be accounted for by standard mapping functions include: pan, tilt, roll, translation, and/or zoom of the image capture devices. However, differences in spectral sensitivity between the image capture devices capturing the two images that are to be registered may result in an inability for traditional image feature matching approaches to be able to successfully match features between the two images, as will be discussed further herein.

As may be appreciated, identifying a good set of matching features between the images being registered is important in determining a successful mapping function. These features can be determined manually or automatically—although manual identification would be unlikely to work in many real-time or remote applications. The automatic feature identification methods may work by algorithmically analyzing image data and producing so-called "feature descriptors" for each identified feature, to go along with the feature's respective image coordinates. Image features preferably reflect portions of an image that may be found automatically and accurately between images being registered—even if there are minor changes in scale or perspective between the images being registered. These features typically comprise either high contrast corners, edges, or other local extrema in intensity. In order to differentiate one image feature from another, a description of the feature, i.e., the aforementioned feature descriptor, is generated to allow the same point to be recognized if it appears in another image of the scene.

As mentioned above, these feature descriptors are also preferably invariant to changes in perspective and scale between images. Examples of image feature descriptors include: the Scale Invariant Feature Tracker (SIFT) feature, the Speeded-up Robust Features (SURF) feature, the Orientated FAST and Rotated BRIEF (ORB) feature, the Binary Robust Invariant Scale Keypoints (BRISK) feature, the Binary Features from Robust Orientation Segment Tests (BFROST) feature, and many others.

Image registration is a relatively mature field and is often used in robotics, autonomous vehicles, and other systems where machine vision is a key aspect. Image registration is also used in more conventional applications, such as image editing (e.g., when attempting to add image features from one image to another image at the corresponding location in the other image). However, there are still opportunities for improvement, such as the aforementioned multispectral image data scenario, wherein the image capture devices capturing the images that are to be registered have a difference in spectral sensitivity (e.g., where one image capture device is predominantly sensitive to visible light wavelength ranges, and the other image capture device is predominantly sensitive to non-visible light wavelength ranges). Thus, it would be desirable to have methods and systems that provide for improved image registration, especially in instances of unaligned multispectral image data that is difficult for traditional image registration techniques to handle, e.g., by leveraging machine learning models built based on features detected from large training sets of aligned multispectral image data.

SUMMARY

Image sensors capable of capturing aligned multispectral image data, e.g., including image data in both visible wavelength ranges and non-visible wavelength ranges (such as infrared (IR)), offer the opportunity to increase the amount of detail and context achievable in a captured image, e.g., by leveraging the accuracy of structural correspondences between the aligned captured images. This means that, even though the visible light signal strength may be very low in a given scene, the multispectral signal strength (e.g., which includes non-visible light signal information) may still be appreciably above the level of noise, and may thus be used to aid in the performance of various image processing operations, such as image fusion, to generate an enhanced output image—assuming that proper correspondences may be determined between the image data in the visible wavelength ranges and the image data in the non-visible wavelength ranges.

As alluded to above, image sensors capable of capturing aligned multispectral image data may advantageously provide for a common pixel coordinate system between the image data in both the visible ranges and non-visible wavelength ranges. In other words, because the captured image data is pre-aligned (e.g., via being captured by a single multispectral imaging sensor), it may be assumed that two features appearing at the same image coordinate in the both the visible image data and the non-visible image data are indeed reflective of the same image feature in the scene—even if the respective feature descriptors for such features are not similar to one another (which may often be the case when comparing feature descriptors across different spectra).

Embodiments described herein may thus leverage machine learning systems and methods to better match these multispectral features across images. This may be done by creating a training dataset of pairs of feature descriptors, together with a strength value indicating whether each pair is likely a strong match or not. The feature descriptor dataset may be created by running standard image feature algorithms on the image data from each spectrum of a set of aligned, i.e., preregistered, multispectral images and using the image coordinates of such identified features (as opposed to the similarity of the features' respective feature descriptors) to determine which image feature pairs (and, thus, which image feature descriptors) match each other. Training a ML-based model on aligned multispectral image data allows for the later use of such models to match features across spectra on images that are not aligned, i.e., do not share common pixel coordinates, and/or features that may not have similar feature descriptors (e.g., a feature that looks very different in the visible spectrum than it does in the non-visible spectrum, yet still represents the same feature in the scene). Using multispectral image data may be particularly advantageous in generating high quality output images, especially if the image data captured in each spectrum is of a similar quality level (e.g., in terms of sharpness, contrast, color reproduction, and/or resolution), because the additional spectra may enable more detail and/or context from a scene to be realized.

Thus, devices, methods, and non-transitory program storage devices (NPSDs) are disclosed herein to provide for ML-enhanced feature matching model creation leveraging multispectral image data that have improved accuracy for performing image registration on multispectral image data, especially unaligned multispectral image data, e.g., image data coming from two spatially-distinct image capture devices with different spectral sensitivities.

According to some embodiments, there is provided a method for image processing, comprising: obtaining aligned multispectral image data; generating a first plurality of feature descriptors for features identified in the aligned multispectral image data; generating a training set of feature descriptor pairs based on the generated first plurality of feature descriptors; and training a ML model based on the generated training set of feature descriptor pairs, wherein the trained ML model is configured to determine matches between features in unaligned multispectral image data. The aligned multispectral image data may, e.g., comprise a first plurality of aligned multispectral images, wherein each aligned multispectral image comprises at least a first portion of image data in a first spectrum and at least a second portion of image data in a second spectrum, wherein the first spectrum and second spectrum are in at least partially non-overlapping wavelength ranges, and wherein the first portion and second portion are aligned.

In some embodiments, the first plurality of aligned multispectral images may comprise sets of images having aligned visible image data (e.g., red-green-blue (RGB) data, RGB+Depth (RGB-D) data, YUV data, grayscale luminance data, etc.) and non-visible image data (e.g., IR data, such as Near IR (NIR) data or Long Wavelength IR (LWIR) data, or even Ultraviolet (UV) data, etc.). In some embodiments, the first plurality of aligned multispectral images comprise images captured by the same image capture device.

In some embodiments, the first plurality of feature descriptors for the aligned multispectral image data comprises: a first set of feature descriptors for features in the first portion of image data in the first spectrum; and a second set of feature descriptors for features in the second portion of image data in the second spectrum. In some cases, each of the feature descriptor pairs in the generated training set comprises a match between a feature descriptor from the first set and a feature descriptor from the second set. In some cases, each of the feature descriptor pairs in the generated training set further comprises a strength value, e.g., a strength value that is based, at least in part, on a distance between: a location within a given image of the first plurality of aligned multispectral images of a respective feature represented in the first set of feature descriptors; and a location within the given image of the respective feature represented in the second set of feature descriptors. For example, smaller distances between the locations of matching features within a given feature descriptor pair may correlate to a larger strength value being assigned to the given feature descriptor pair, while larger distances between the locations of matching features within a given feature descriptor pair may correlate to a smaller strength value being assigned to the given feature descriptor pair.

According to still other embodiments, the method for image processing may further include steps to use the trained ML model to determine matches between features in unaligned multispectral image data, the method further comprising: obtaining unaligned multispectral image data; generating a second plurality of feature descriptors for features identified in the unaligned multispectral image data; and using the trained ML model to determine matches between features represented in the second plurality of feature descriptors for the unaligned multispectral image data. In some cases, the method may further perform an image registration operation on the unaligned multispectral image data based, at least in part, on the determined matches between features represented in the second plurality of feature descriptors for the unaligned multispectral image data, to generate aligned multispectral image data. In some cases, the method may still further perform a fusion operation (or other desired image processing operation) on the aligned multispectral image data to generate an enhanced output image. In some scenarios, the unaligned multispectral image data may comprise one or more images comprising image data captured by two or more spatially-distinct image capture devices, e.g., two separate single-spectrum cameras mounted at different locations on an electronic device.

Various NPSD embodiments are also disclosed herein. Such NPSDs are readable by one or more processors. Instructions may be stored on the NPSDs for causing the one or more processors to perform any of the ML-enhanced feature matching model creation and use techniques for multispectral image data disclosed herein.

Various programmable electronic devices are also disclosed herein, in accordance with the NPSD and method embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

Figure 1A:
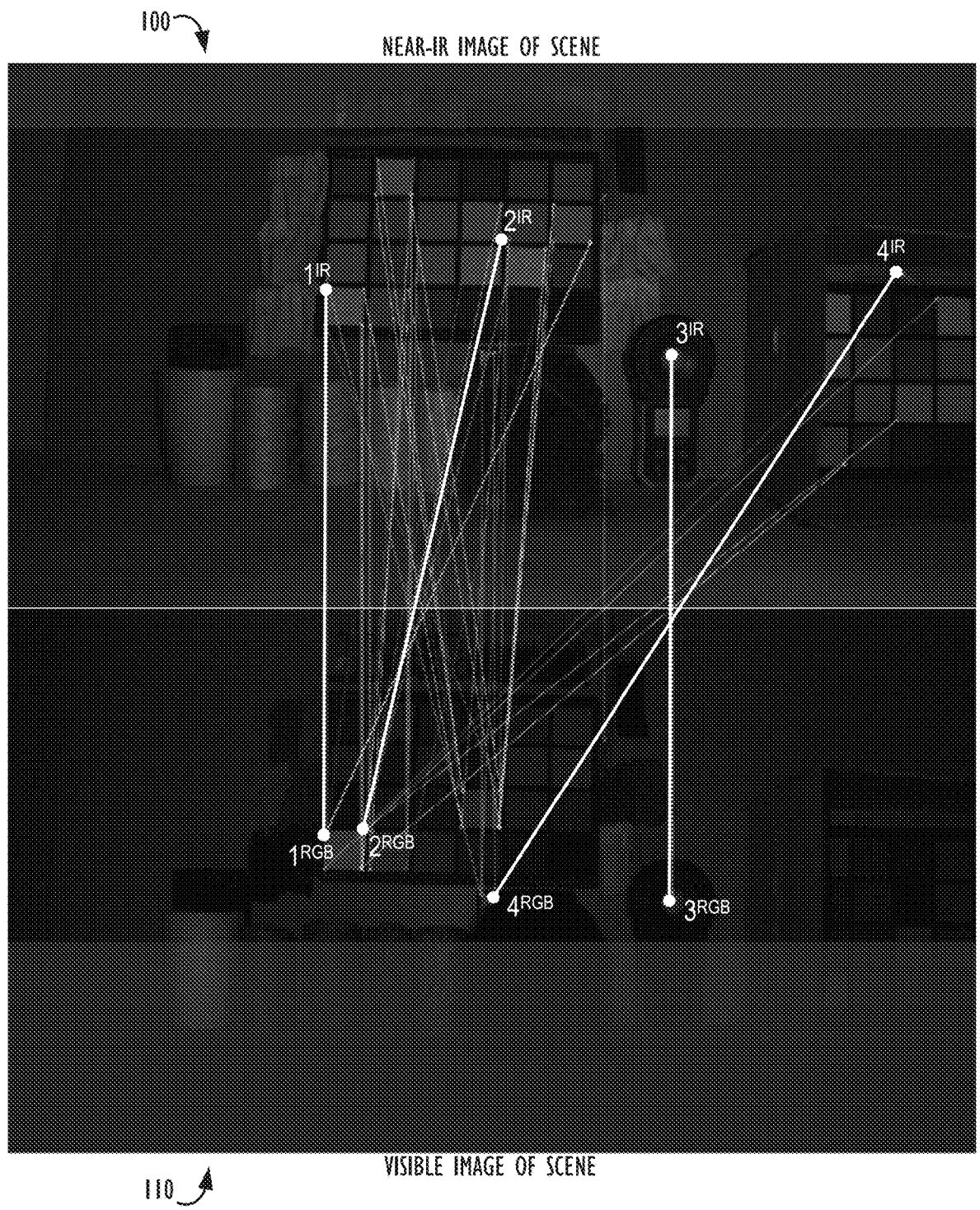
FIG. 1A illustrates exemplary identified matching and mismatching features between aligned NIR and visible images of a captured scene, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

As used herein, the terms "multispectral image" or "multispectral image data" refers to captured images or image data having a first set of channels comprising captured light information over a first range of wavelengths (which may also be referred to herein as "primary channels") and at least one additional channel comprising captured light information over a second range of wavelengths (which may also be referred to herein as "multispectral channels"), wherein the first and second ranges of wavelengths may be non-contiguous (or at least partially non-overlapping). In some examples, the multispectral channel of multispectral image data may predominantly measure light information in a non-visible wavelength range (e.g., infrared or ultra-violet ranges), while the primary channels of the multispectral image data may predominantly measure light information in a visible wavelength range (e.g., red, green, and/or blue channels). The availability of multispectral image data comprising both visible light information and corresponding non-visible light information from a captured scene may be used to improve or enhance the quality of a captured image. The techniques described herein may be used with active illumination in visible, non-visible, or a combination of visible and non-visible wavelength ranges. When the active illumination is in the non-visible wavelength ranges only, such active illumination may be used in low lighting conditions, which can improve image capture performance, even in instances when a user does not want a visible or perceptible camera flash.

In other examples, one or more of the channel(s) of a multispectral image or multispectral image data may comprise a "mixed channel," i.e., a channel that measures light in both visible and non-visible wavelength ranges, as in the case of some RGB-W sensors, e.g., when used without an IR-cut filter. In that case, the response of the red channel is technically a mix of Red+IR, the green channel a mix of Green+IR, the blue channel a mix of Blue+IR, and the white channel a mix of Red+Green+Blue+IR. By solving this linear system of equations, the response to the IR signal in the captured scene may be isolated and treated as separate a multispectral channel, if desired.

In some cases, however, it may be preferable to use a camera with a dedicated, single aperture, multispectral RGB-IR image sensor that is capable of creating aligned (i.e., pre-registered) images, wherein each pixel contains information in each spectra (e.g., a camera that creates four channel RGB+IR images). Preferably, the images created in each spectrum are of comparable quality (e.g., in terms of sharpness, contrast, color reproduction, and/or resolution) to each other—and to images that may be captured in a given spectrum by a typical dedicated single-spectrum image sensor. Other techniques and image sensor types may also be used to capture and generate aligned multispectral image data, e.g., cameras with a filter pattern such as a 2×2 RGB+IR Bayer pattern that may be used to produce low-resolution multispectral images of a captured scene, low resolution image spectrometers that provide finer spectral sampling per pixel, or cameras with a filter wheel placed in front of the lens that is used to capture a sequence of images each through a different filter to obtain a series of full resolution images, each within a different spectrum, etc. However, each of these other techniques and image sensor types may present unique challenges to overcome, in order to obtain large enough quantities of reliably high-quality multispectral image data, as may be needed to train the various ML models that will be discussed herein.

As used in the various examples described in detail herein, the term "multispectral image" or "multispectral image data" will refer to image data that includes at least some IR signal data (unless otherwise noted), although it is to be understood that, in other examples, multispectral image data need not necessarily include IR signal data specifically or non-visible data generally, and may instead include captured light information over any two or more non-contiguous (or at least partially non-overlapping) wavelength ranges.

MULTISPECTRAL IMAGE EXAMPLES

One of the reasons for using multispectral image data when capturing images of a scene is that additional information can be gathered beyond that which is evident in the visible spectrum. One example of this phenomenon is evidenced by the fact that capturing an image of a photo of a human face (e.g., on a sheet of paper tacked to a bulletin board) is easily discernible from an image of an actual human face when looking in the Near IR (NIR) spectrum, but it may have very similar appearance to an image of an actual human's face when looking in the visible (e.g., RGB) spectrum. Another example of this phenomenon might be evidenced in a situation where a car that has recently been parked among others in a parking lot is easily discernible in the Long Wavelength IR (LWIR) spectrum from the other cars in the parking lot, e.g., due to its hot engine, however, neither its color scheme nor license plate can be identified in LWIR. Thus, it may be beneficial to register the LWIR image with a visible spectrum image of the same scene, e.g., in order to find out the color of the recently-parked car and/or what its license plate number is.

The examples above help illustrate that the different appearance of objects in different spectra allows for more information to be gathered by using multispectral image data, which, in turn, can facilitate better decisions being made about the images and/or allow for enhanced image processing. However, because objects do look different in different spectra, the corresponding feature descriptors calculated for such image features in each spectrum will also likely be very different. For instance, an image of the back of a car could have many corner features (e.g., in the text of the license plate) in the visible spectrum that are completely absent in the LWIR spectrum. Similarly, a local maximum feature that the LWIR detects due to the red hot exhaust of the car will not be present at all in the visible spectrum. Some features, however, such as the edges of the car, might be common to both the LWIR and visible spectrum images. However, since the image content around these features will be different in each spectral image, their respective feature descriptors could vary greatly. Thus, even if it was known which features were common between the images, because their descriptors would likely be so different, it would likely not be possible to reliably match them correctly.

So, not only are fewer correct feature matches likely to be found between images of different spectra, there are normally more incorrect matches, too. This can be seen, e.g., in FIG. 1A, which has a NIR image 100 on top, the corresponding visible image 110 at the bottom, and lines joining exemplary identified matching feature pairs (e.g., $1^{IR}$-$1^{RGB}$, $2^{IR}$-$2^{RGB}$, $3^{IR}$-$3^{RGB}$, and $4^{IR}$-$4^{RGB}$). In this example, the images 100/110 have been aligned for ease of illustration purposes, so any drawn lines which are not vertical (e.g., the lines for features 2 and 4) are necessarily representative of incorrect matches that have been identified by the a feature matching algorithm, e.g., using ORB features or any other desired feature detector algorithm.

Figure 1B:
FIG. 1B illustrates an exemplary registration of a visible image to an NIR image, based on the matching and mismatching features identified in FIG. 1A, according to one or more embodiments.

Turning now to FIG. 1B, an exemplary registration 150 of a visible RGB image 154 (corresponding to image 110 of FIG. 1A) to an NIR image 152 (corresponding to image 100 of FIG. 1A) is shown, based on the matching and mismatching features identified in FIG. 1A (including exemplary feature pairs 1-4, discussed above). As is illustrated in exemplary registration 150, the use of a large number of mismatched features (i.e., represented by all the non-vertical feature lines in FIG. 1A) has caused the registration to fail, as evidenced by visible image box 154 being both skewed and shrunk in the center of NIR image box 152, due to the aforementioned large number of mismatching features that were identified. [In this example, the mapping equation used was the 5-degree of freedom least squares best fit, with values for: X scale, Y scale, X offset, Y offset, and in-plane rotation. Though, as mentioned above, any desired mapping equation may be used to suit a given implementation.]

Figure 2A:
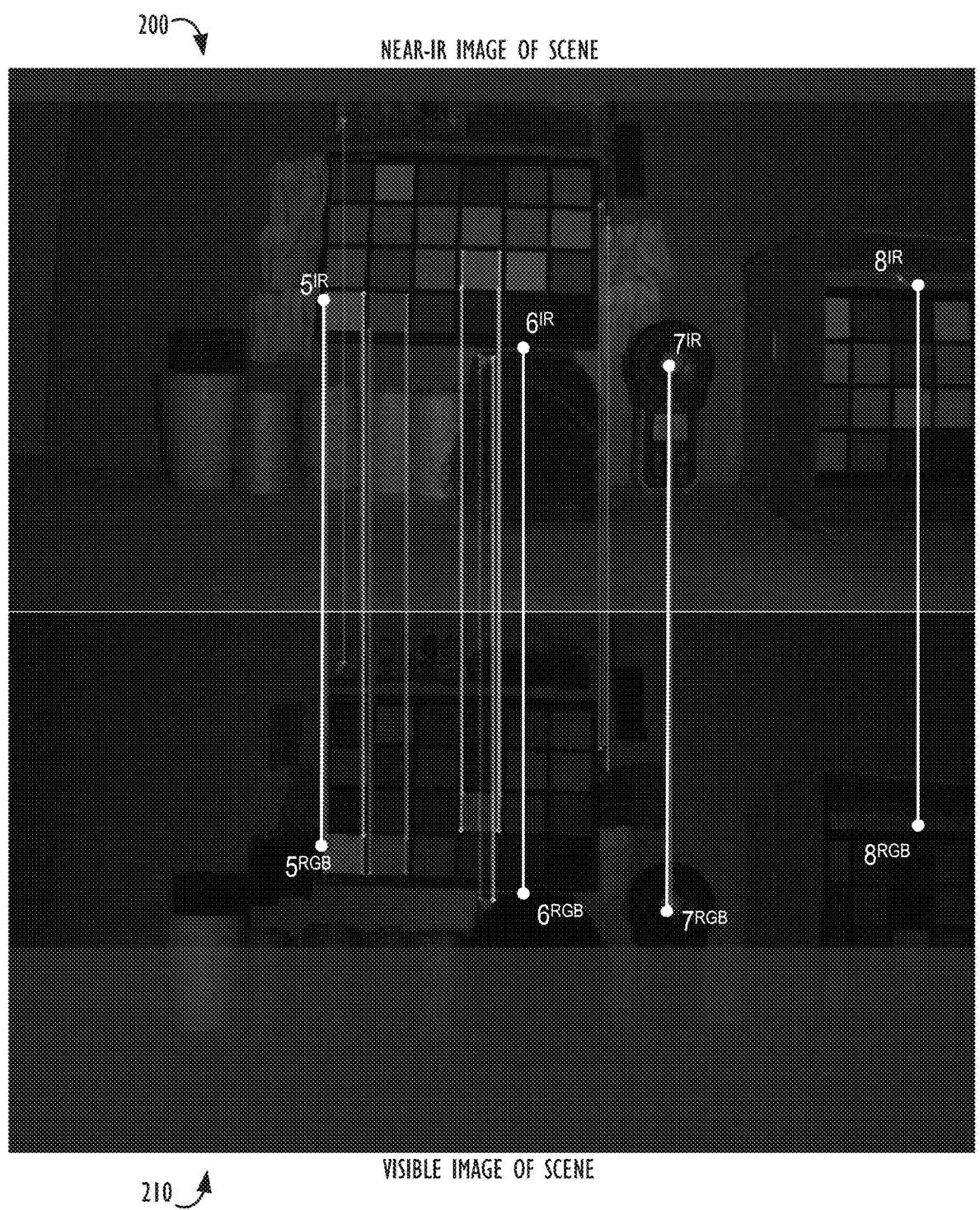
FIG. 2A illustrates exemplary identified matching features between aligned NIR and visible images of a captured scene, according to one or more embodiments.

Turning now to FIG. 2A, exemplary identified matching features, e.g., matching features as identified using a trained ML model such as those described herein, are shown between an aligned NIR image 200 and visible image 210 of a captured scene, according to one or more embodiments. As in FIG. 1A, lines are shown joining exemplary identified matching feature pairs (e.g., $5^{IR}$-$5^{RGB}$, $6^{IR}$-$6^{RGB}$, $7^{IR}$-$7^{RGB}$, and $8^{IR}$-$8^{RGB}$) between NIR image 200 on top, the corresponding visible image 210 at the bottom. In this example, too, the images 200/210 have already been aligned for ease of illustrative purposes, so any drawn lines that are not vertical are again representative of incorrect matches that have been identified. However, as will be explained in further detail below, by leveraging a trained ML model for feature matching, the matching features identified in FIG. 2A are all connected with vertical lines, indicating that they reflect correct feature matches between image 200 and image 210.

Figure 2B:
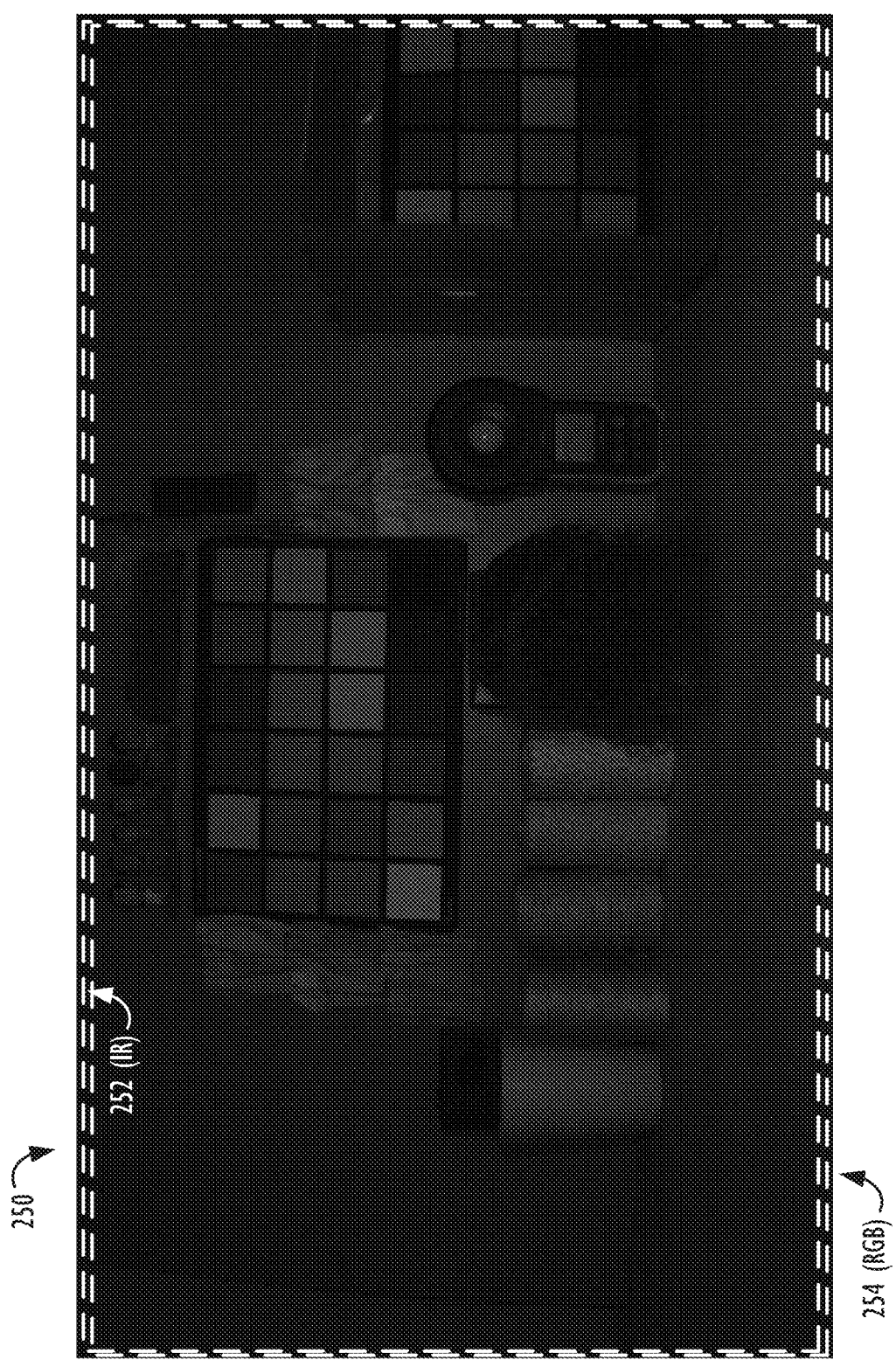
FIG. 2B illustrates an exemplary registration of a visible image to an NIR image, based on the matching features identified in FIG. 2A, according to one or more embodiments.

Turning now to FIG. 2B, an exemplary registration 250 of a visible RGB image 254 (corresponding to image 210 of FIG. 2A) to an NIR image 252 (corresponding to image 200 of FIG. 2A) is shown, based on the matching features identified in FIG. 2A (including exemplary feature pairs 5-8, discussed above). As is illustrated in exemplary registration 250, the use a large number of properly matched features (i.e., represented by all the vertical feature lines in FIG. 2A) has caused the registration to be successful, as evidenced by visible image box 254 being almost perfectly aligned with the NIR image box 252, after the determined mapping function has been applied.

Exemplary System for Training and Use of ML-Enhanced Feature Matching Model

Figure 3:
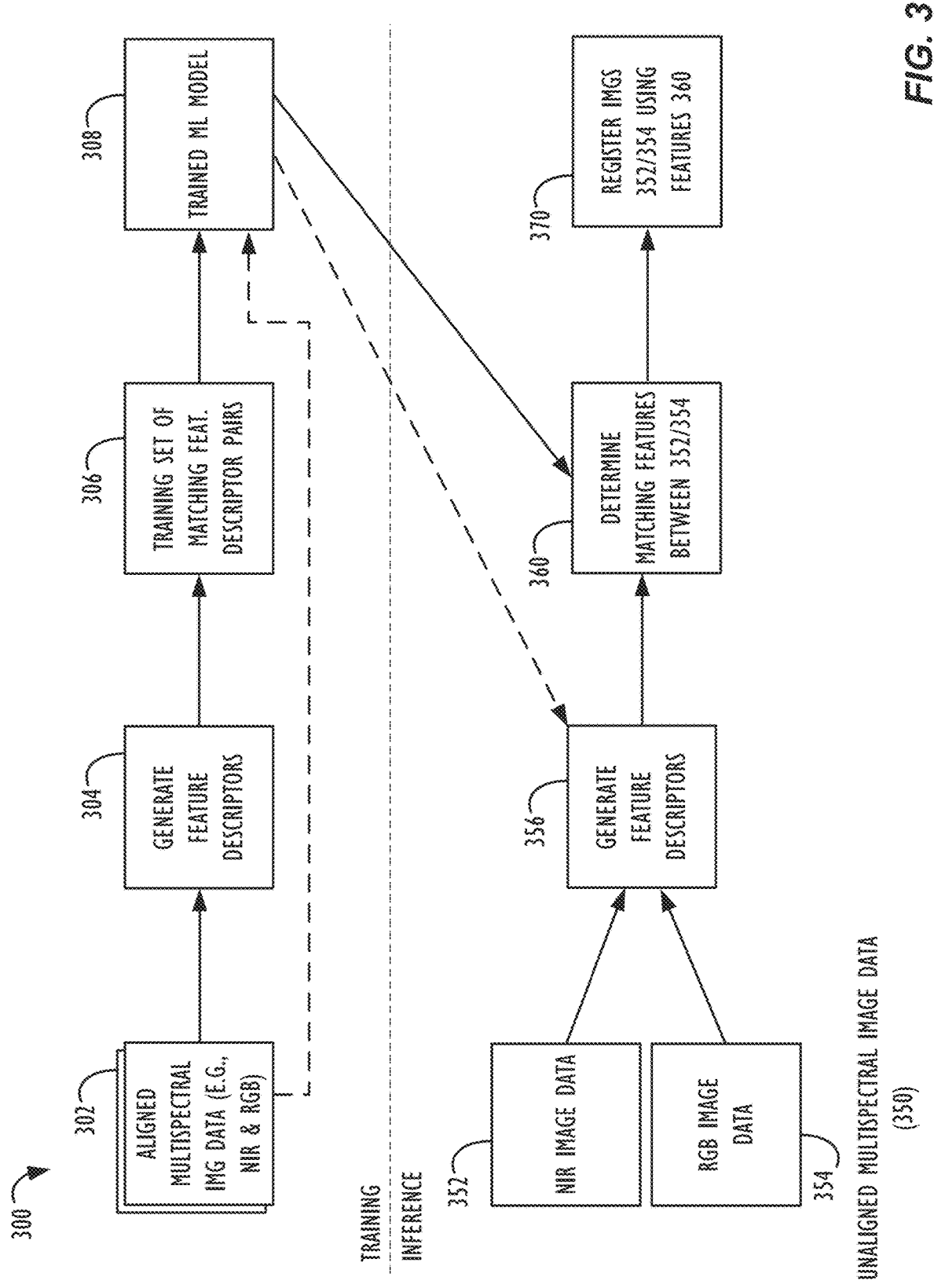
FIG. 3 illustrates an exemplary system for training and use of a ML-enhanced feature matching model, according to one or more embodiments.

Turning now to FIG. 3, an exemplary system 300 for training and use of a ML-enhanced feature matching model is shown, according to one or more embodiments. The components above the dashed line in FIG. 3 represent the training phase for the feature matching model, while the components below the dashed line in FIG. 3 represent the use of the trained feature matching model at inference time. Beginning with block 302, a training set of aligned multispectral image data is obtained. As described above, the aligned multispectral image data may, e.g., comprise a first plurality of aligned multispectral images, wherein each aligned multispectral image comprises at least a first portion of image data in a first spectrum and at least a second portion of image data in a second spectrum, wherein the first spectrum and second spectrum are in (at least partially) non-overlapping wavelength ranges, and wherein the first portion and second portion are aligned. In some embodiments, the first plurality of aligned multispectral images may comprise sets of images having aligned visible image data (e.g., RGB data) and non-visible image data (e.g., IR data or NIR data, specifically). In some embodiments, the first plurality of aligned multispectral images comprise images captured by the same image capture device of an electronic device, such as an RGB-IR sensor.

Next, at block 304, the system may generate a first plurality of feature descriptors for features identified at various positions across corresponding multispectral images. For example, a feature located at coordinates (X, Y) in a visible image of a captured scene may be said to match with a feature located at corresponding coordinates (X, Y) (or within some acceptable threshold distance from coordinate (X,Y), e.g., within 2 pixels in any direction) in a corresponding non-visible image of the captured scene. As mentioned above, in some embodiments, a feature may comprise both a coordinate position, as well as a feature descriptor. Any desired feature descriptor may be employed in a given implementation, e.g., the aforementioned Scale Invariant Feature Tracker (SIFT) feature, the Speeded-up Robust Features (SURF) feature, the Orientated FAST and Rotated BRIEF (ORB) feature, the Binary Robust Invariant Scale Keypoints (BRISK) feature, the Binary Features from Robust Orientation Segment Tests (BFROST) feature, or many others. Because of the vast potential differences in multispectral data values obtained for the same portion of a scene (e.g., as described in the car parking lot example above), the feature descriptors for a given pair of corresponding features in multispectral image data may actually be quite different from each other, which may cause a traditional image registration to conclude that the two feature descriptors do not actually reflect a matching feature. However, due to the aligned nature of the multispectral image data 302 being used to train the ML model in this example, the respective coordinates of the corresponding features may be used to confirm whether (and, in some cases, to what extent) two identified features are a good match—regardless of how different their respective feature descriptors may be. In some cases, a strength value may also be assigned to each feature descriptor pair, wherein the strength value is based, at least in part, on a distance between the coordinates of the identified corresponding features in their respective images.

Turning now to a more detailed example, the first plurality of feature descriptors generated at block 304 for the aligned multispectral image data may comprise: a first set of feature descriptors representing features in a first portion of the aligned multispectral image data from block 302 that is in a first spectrum; and a second set of feature descriptors representing features in a second portion of the aligned multispectral image data from block 302 that is in a second spectrum. In some cases, each of the feature descriptor pairs that will be included in the generated training set at block 306 comprises a match (i.e., a match of at least some strength) between a feature descriptor from the first set and a feature descriptor from the second set. As mentioned above, the matches in some training scenarios may be determined based on the coordinates of the locations of the respective features within their respective images—rather than the similarity between their respective feature descriptors. In some cases, each of the feature descriptor pairs in the generated training set at block 306 may further comprise a strength value, e.g., a strength value that is based, at least in part, on a distance between: a location within a given image of the first plurality of aligned multispectral images of a respective feature represented in the first set of feature descriptors; and a location within the given image of the respective feature represented in the second set of feature descriptors. For example, the closer that the coordinates of the respective features for two feature descriptors in a feature descriptor pair are, the higher that feature descriptor pair's strength value may be set to. In some cases, it may be beneficial to include mismatched (or poorly-matched) feature descriptor pairs in the training set, i.e., those feature descriptor pairs that have a relatively lower strength value, such that the trained ML model can also learn examples of feature descriptor pairs that may not be indicative of actual matching features in input multispectral image data. When feature descriptor pairs that have similarity to the mismatched feature descriptor pairs the model was trained on are then encountered by the model at inference time, they can either not be reported as matching features or be reported as matching features with such low strength values that they would not have a large influence on any subsequent image registration operations.

Next, at block 308, a training set of matching feature descriptor pairs generated at block 306 may be used to train a ML model at block 308, wherein the resulting trained ML is configured to determine matches between features in aligned multispectral data, as well as in unaligned multispectral image data, e.g., so long as the unaligned multispectral image data has spectral sensitivities profiles similar to the aligned multispectral data upon which the model was trained. In some cases, it may be advantageous to also provide the input image data 302 itself to the ML model 308 (represented by the dashed line arrow between blocks 302 and 308), so that the model could then use the ML to create a better feature descriptor from the input image data and, e.g., learn how to match those feature descriptors, rather than using the features descriptors provided by SURF/SIFT/ORB/etc. In other words, by providing the ML model with the images associated with matching features, the model itself can determine how to best describe such features, so that it can later match similar features that it may encounter at inference time (represented by the dashed line arrow between blocks 308 and 356). As may now be appreciated, even though the ML model was trained leveraging the accurate feature location correspondences provided by using aligned multispectral image data to learn what corresponding feature descriptors in one spectrum look like in another spectrum, the model may now also be advantageously employed to identify matching feature descriptors in image data sets across spectra that come from multiple image data sources that are not pre-aligned or pre-registered, e.g., spatially-distinct cameras mounted at different locations on a single electronic device. It will be appreciated that the machine learning model could take many forms, including: neural network, genetic algorithms, Support Vector Machines (SVM), Random Forest, K-Means, Matrix Factorization, expert systems, or any other machine learning approaches.

Moving now below the dashed line to the inference time usage of the trained feature matching model, image data, e.g., unaligned multispectral image data (350) may be obtained. As described above, the unaligned multispectral data may comprise a plurality of images captured by two or more spatially-distinct image capture devices that also have different spectral sensitivity profiles, e.g., an image sensor sensitive to the non-visible range of the spectrum that captures NIR image data 352 that is mounted adjacently to an image sensor sensitive to the visible range of the spectrum that captures RGB image data 354. The image pairs (or sets of greater than two corresponding images, if more than two such spatially-distinct image capture devices are present in a given electronic device) may be captured concurrently, or with some amount of temporal offset. The difference in spatial positioning between the image capture devices and/or any temporal offsets in the images captured by the image capture devices can each cause the corresponding features in the captured images to be located at vastly different image coordinate positions in the respective images. Also, as described earlier, because the image capture devices in this scenario have different spectral sensitivity profiles, it is unlikely that the feature descriptors for corresponding features will be similar enough to be used with traditional feature matching processes. As such, without the aid of a trained ML model, such as that described above with reference to block 308, performing image registration on unaligned multispectral image data may prove quite difficult.

Moving now to block 356, feature descriptors may be generated for the unaligned multispectral image data 350 (e.g., for features identified in NIR image data 352 as well as features identified within RGB image data 354). Then, at block 360, the trained ML model from block 308 may be used to determine matching features between the unaligned multispectral image data 350, i.e., between NIR image data 352 and RGB image data 354, in this example. Finally, at block 370, the multispectral image data may be registered based, at least in part, on the matching features identified at block 360. Once registered, various desired image processing operations may be performed on the now-aligned multispectral image data, e.g., an image fusion operation, to generate an enhanced output image. In other examples, the now-aligned multispectral image data may be used to provide additional contextual information to supplement the portions of the image captured in the visible spectrum, such as in the car parking lot example described above.

Exemplary Methods for Training and Use of ML-Enhanced Feature Matching Model

Figure 4:
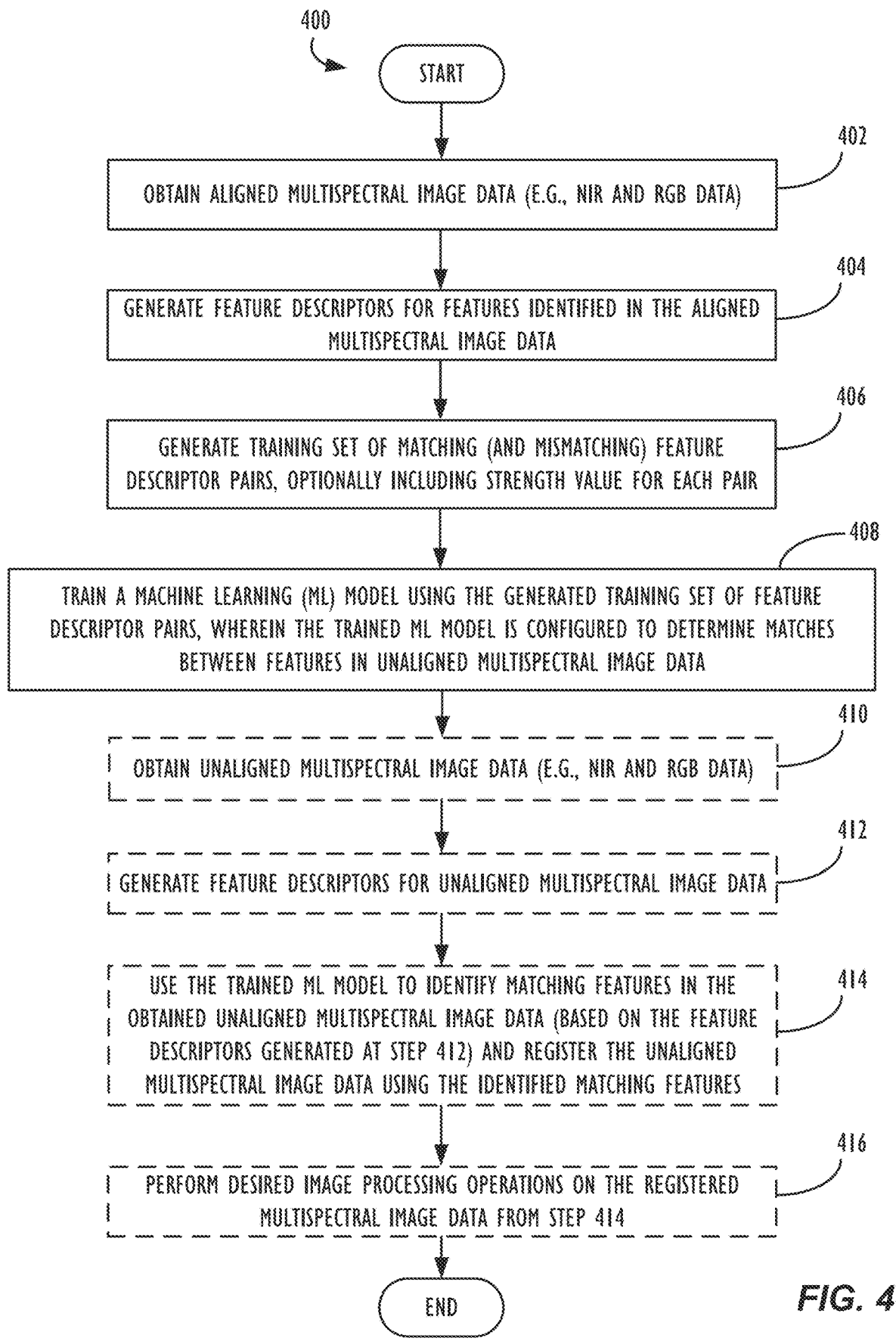
FIG. 4 is a flow chart illustrating a method of training and use of a ML-enhanced feature matching model, according to various embodiments.

Turning now to FIG. 4, a flow chart 400 illustrating a method of training and use of a ML-enhanced feature matching model is shown, according to various embodiments. First, at Step 402, the method 400 may obtain aligned multispectral image data (e.g., aligned NIR and RGB image data, as has been discussed previously). Next, at Step 404, the method 400 may generate feature descriptors for the aligned multispectral image data. Next, at Step 406, the method 400 may generate a training set of matching (and mismatching) feature descriptor pairs, optionally including a strength value for each pair. As described above, according to some embodiments, the strength of a matching between a given pair of features may be based on the closeness of the coordinates within their respective images, as opposed to the similarity between the features' respective feature descriptors. Next, at Step 408, the method 400 may train a machine learning model using the generated training set of feature descriptor pairs, wherein the trained ML model is configured to determine matches between features in unaligned multispectral image data.

If the model developed at Step 408 is to be applied at inference time, the method 400 may proceed to Step 410 and obtain unaligned multispectral image data (e.g., again NIR and RGB image data, but perhaps from different camera units or apertures that are spatially-distinct from one another, thus providing no 1:1 "ground truth" correspondence of a given identified feature's location within each image). Next, at Step 412, the method 400 may generate feature descriptors for the unaligned multispectral image data. At Step 414, the method 400 may use the trained ML model to identify matching features in the obtained unaligned multispectral image data (i.e., based on the feature descriptors generated at Step 412) and register the unaligned multispectral image data using the identified matching features. As mentioned above, at Step 416, once the images are registered, various desired image processing operations may be performed on the registered multispectral image data, e.g., an image fusion operation, to generate an enhanced output image. (Note: The optionality of the performance of inference time Steps 410 through 416 is indicated by the use of dashed line boxes in FIG. 4.)

Exemplary Electronic Computing Devices

Figure 5:
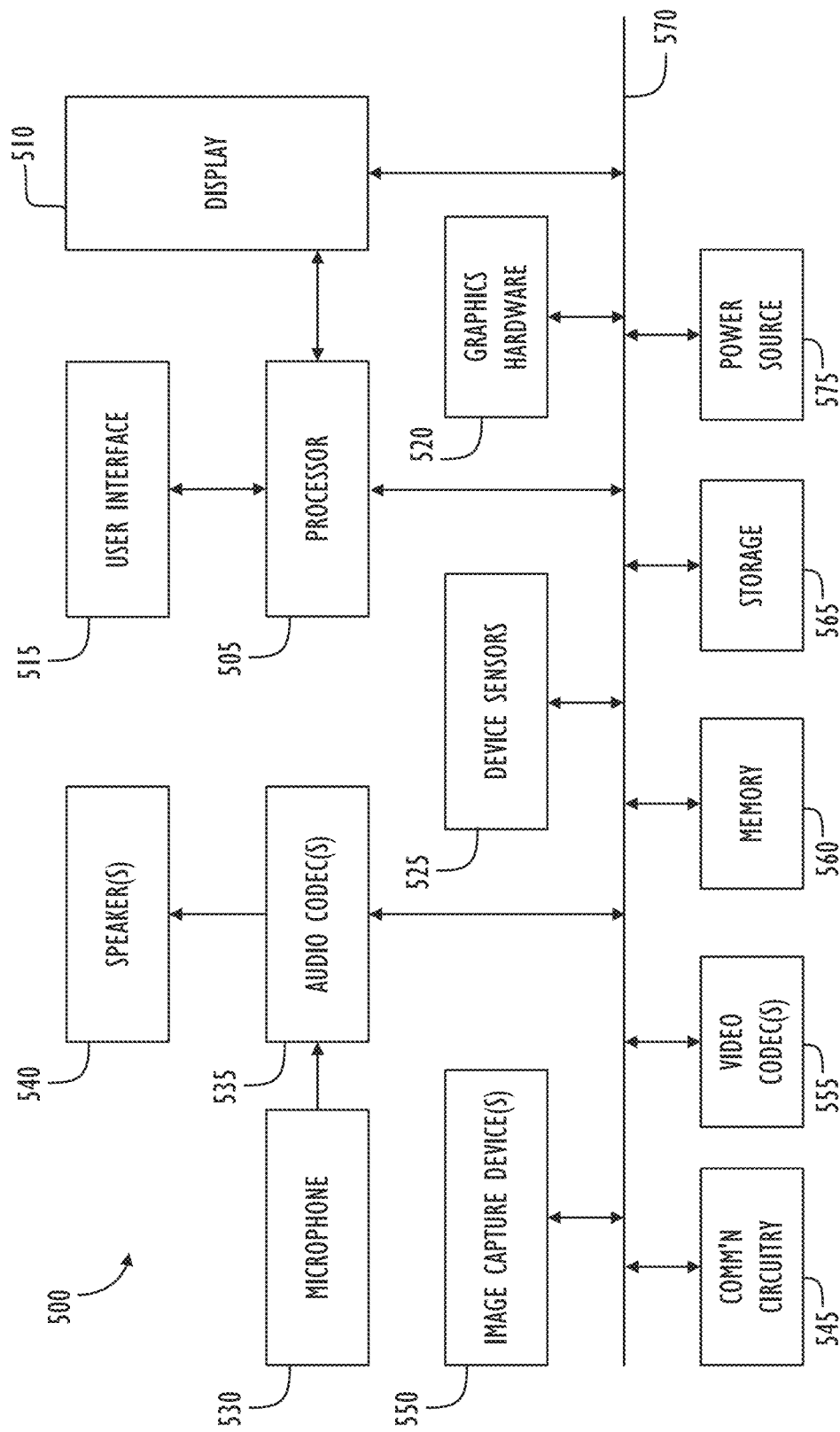
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to generate noise-reduced versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory; and
   one or more processors operatively coupled to the memory, wherein the one or more processors are configured to execute instructions causing the one or more processors to:
      obtain aligned multispectral image data comprising a first plurality of aligned multispectral images, wherein each aligned multispectral image comprises at least a first portion of image data in a first spectrum and at least a second portion of image data in a second spectrum, wherein the first spectrum and second spectrum are in at least partially non-overlapping wavelength ranges, and wherein the first portion and second portion are aligned;
      generate a first plurality of feature descriptors for features identified in the aligned multispectral image data, comprising:
         a first set of feature descriptors representing features in the first portion of image data in the first spectrum; and
         a second set of feature descriptors representing features in the second portion of image data in the second spectrum;
      generate a training set of feature descriptor pairs based on the generated first plurality of feature descriptors; and
      train a machine learning (ML) model based on the generated training set of feature descriptor pairs, wherein the trained ML model is configured to determine matches between features in unaligned multispectral image data.

2. The device of claim 1, wherein the first plurality of aligned multispectral images comprises sets of images having aligned visible image data and non-visible image data.

3. The device of claim 2, wherein the visible image data comprises RGB image data, and wherein the non-visible image data comprises infrared (IR) image data.

4. The device of claim 1, wherein the first plurality of aligned multispectral images comprise images captured by a first image capture device.

5. The device of claim 1, wherein at least one of the feature descriptor pairs in the generated training set comprises a match between a feature represented in the first set of feature descriptors and a feature represented in the second set of feature descriptors.

6. The device of claim 5, wherein each of the feature descriptor pairs in the generated training set further comprises a strength value.

7. The device of claim 6, wherein the strength value of each feature descriptor pair is based, at least in part, on a distance between: a location within a given image of the first plurality of aligned multispectral images of a respective feature represented in the first set of feature descriptors; and a location within the given image of the respective feature represented in the second set of feature descriptors.

8. The device of claim 1, wherein at least one of the first plurality of feature descriptors comprises a description of: a Scale Invariant Feature Tracker (SIFT) feature, a Speeded-up Robust Features (SURF) feature, an Orientated FAST and Rotated BRIEF (ORB) feature, a Binary Robust Invariant Scale Keypoints (BRISK) feature, or a Binary Features from Robust Orientation Segment Tests (BFROST) feature.

9. The device of claim 1, wherein the one or more processors are further configured to execute instructions causing the one or more processors to:
   obtain unaligned multispectral image data;
   generate a second plurality of feature descriptors for features identified in the unaligned multispectral image data; and
   use the trained ML model to determine matches between features represented by the second plurality of feature descriptors for the unaligned multispectral image data.

10. The device of claim 9, wherein the one or more processors are further configured to execute instructions causing the one or more processors to:
    perform an image registration operation on the unaligned multispectral image data based, at least in part, on the determined matches between features represented by the second plurality of feature descriptors for the unaligned multispectral image data, to generate second aligned multispectral image data.

11. The device of claim 10, wherein the one or more processors are further configured to execute instructions causing the one or more processors to:
    perform a fusion operation on the second aligned multispectral image data to generate an enhanced output image.

12. The device of claim 9, wherein the unaligned multispectral image data comprises one or more images comprising image data captured by two or more image capture devices.

13. A non-transitory computer readable medium comprising computer readable instructions executable by one or more processors to:
obtain aligned multispectral image data comprising a first plurality of aligned multispectral images, wherein each aligned multispectral image comprises at least a first portion of image data in a first spectrum and at least a second portion of image data in a second spectrum, wherein the first spectrum and second spectrum are in at least partially non-overlapping wavelength ranges, and wherein the first portion and second portion are aligned;
generate a first plurality of feature descriptors for features identified in the aligned multispectral image data, comprising:
a first set of feature descriptors representing features in the first portion of image data in the first spectrum; and
a second set of feature descriptors representing features in the second portion of image data in the second spectrum;
generate a training set of feature descriptor pairs based on the generated first plurality of feature descriptors; and
train a machine learning (ML) model based on the generated training set of feature descriptor pairs, wherein the trained ML model is configured to determine matches between features in unaligned multispectral image data.

14. The non-transitory computer readable medium of claim 13, wherein at least one of the feature descriptor pairs in the generated training set comprises a match between a feature represented in the first set of feature descriptors and a feature represented in the second set of feature descriptors.

15. The non-transitory computer readable medium of claim 14, wherein each of the feature descriptor pairs in the generated training set further comprises a strength value.

16. An image processing method, comprising:
obtaining aligned multispectral image data comprising a first plurality of aligned multispectral images, wherein each aligned multispectral image comprises at least a first portion of image data in a first spectrum and at least a second portion of image data in a second spectrum, wherein the first spectrum and second spectrum are in at least partially non-overlapping wavelength ranges, and wherein the first portion and second portion are aligned;
generating a first plurality of feature descriptors for features identified in the aligned multispectral image data, comprising:
a first set of feature descriptors representing features in the first portion of image data in the first spectrum; and
a second set of feature descriptors representing features in the second portion of image data in the second spectrum;
generating a training set of feature descriptor pairs based on the generated first plurality of feature descriptors; and
training a machine learning (ML) model based on the generated training set of feature descriptor pairs, wherein the trained ML model is configured to determine matches between features in unaligned multispectral image data.

17. The method of claim 16, further comprising:
obtaining unaligned multispectral image data;
generating a second plurality of feature descriptors for features identified in the unaligned multispectral image data; and
using the trained ML model to determine matches between features represented by the second plurality of feature descriptors for the unaligned multispectral image data.

18. The method of claim 17, further comprising:
performing an image registration operation on the unaligned multispectral image data based, at least in part, on the determined matches between features represented by the second plurality of feature descriptors for the unaligned multispectral image data, to generate second aligned multispectral image data.

19. The method of claim 18, further comprising:
performing a fusion operation on the second aligned multispectral image data to generate an enhanced output image.

20. The method of claim 16, wherein each of the feature descriptor pairs in the generated training set further comprises a strength value.

* * * * *